K. V. BARNEKOV.
Breech Loading Fire Arm.
No. 4,308. Reissued March 28, 1871.
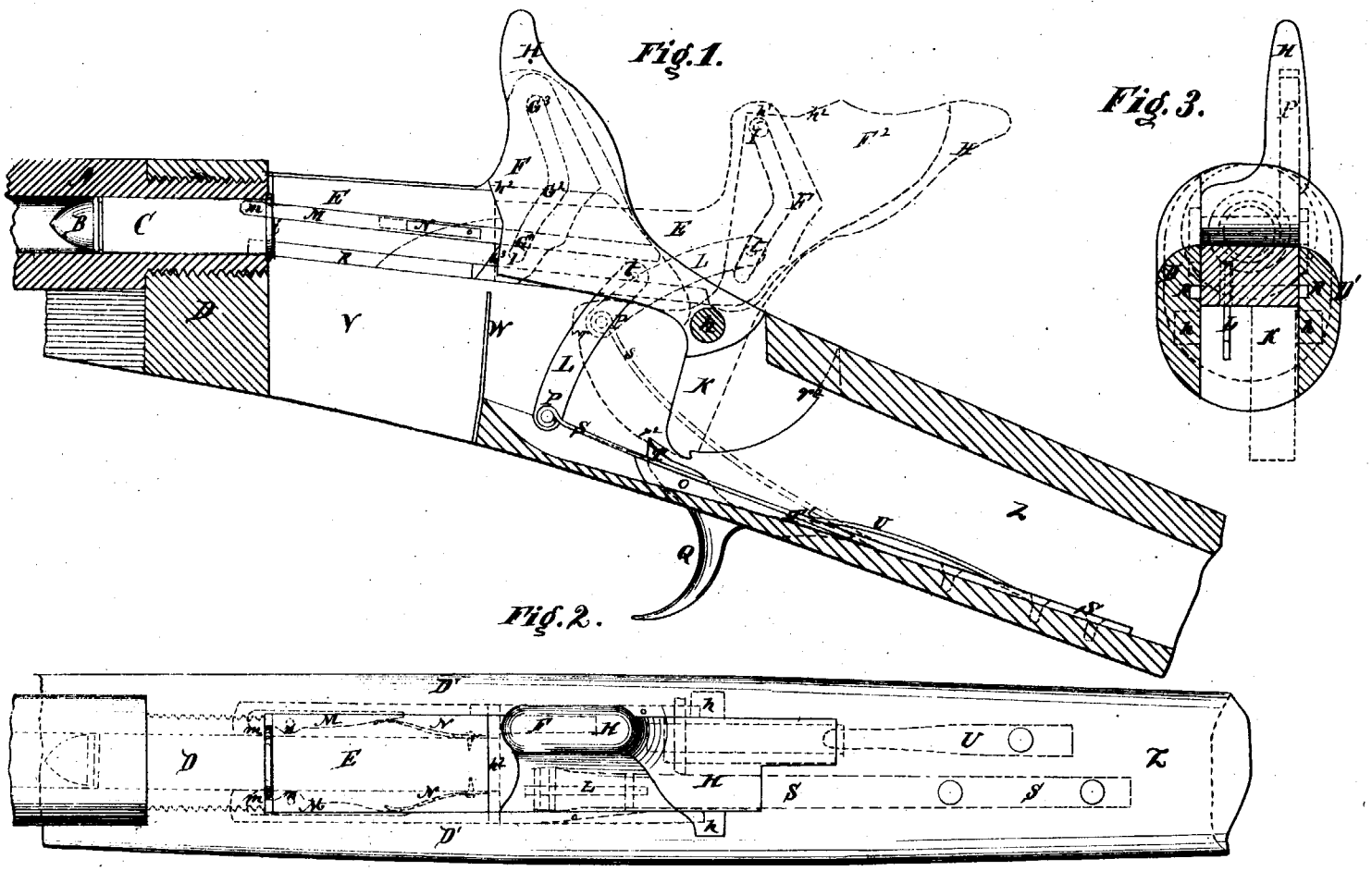
Inventor:
Karl V. Barnekov
by C. C. Tyeaks
Attorney.
Witnesses:
E. R. Brown.
H. L. Pierce
N. PETERS, Photo-Lithographer, Washington, D. C.

UNITED STATES PATENT OFFICE.

KIEL V. BARNEKOV, OF CORNWALL, ASSIGNOR TO HIMSELF AND GEORGE W. GREENE, OF NEW YORK, N. Y.

IMPROVEMENT IN BREECH-LOADING FIRE-ARMS.

Specification forming part of Letters Patent No. 104,100, dated June 14, 1870; Reissue No. 4,308, dated March 28, 1871.

*To all whom it may concern:*

Be it known that I, KIEL V. BARNEKOV, of Cornwall, in the county of Orange and State of New York, have invented a new and useful Breech-Loading Fire-Arm; and I do hereby declare that the following is a full, clear, and exact description thereof, sufficient to enable those skilled in the art to which my invention appertains to make and use the same, reference being had to the accompanying drawings, making part of this specification, and to the letters and figures marked thereon.

The nature of my invention consists in simplifying the construction and reducing the number of the different pieces necessary to make a breech-loading fire-arm, and in so constructing and connecting the parts that a single movement of the hammer opens the breech after the gun has been fired, extracts the empty shell, and the gun is ready to be fired again, after a new cartridge has been inserted in place, without another movement of any of the parts; also, in the peculiar construction of the hammer and breech-block, as hereinafter particularly described.

In the drawings, Figure 1 is a longitudinal section of my improved fire-arm. Fig. 2 is a top view. Fig. 3 is a cross-section of the lock.

A represents the rear end of the barrel; C, the newly-inserted cartridge with ball B; D D the metal frame to receive the parts of the lock and of the breech of the gun. The breech-block E is movable backward and forward in grooves cut into the sides D D, into which fit the projections R R on each side of the breech-block E. This block has a plate-like projection, F, on its rear end, into which is cut a slot, $G' G^2 G^3$. This projection F lies in a recess cut in the hammer H, to receive it when in position, as shown in Fig. 1, and a pin, I, in the lower forward corner of the hammer, goes through the slot at $G'$. The slot $G' G^2$ is shaped concentric with the center $h$ of the hammer H—that is, the hammer H can be drawn backward around the center $h$ without moving the plate F and the breech-block E until the pin I arrives at $G^2$, when, by moving the hammer H still farther back, the pin I pulls back with it the breech-block E until it arrives in the position shown in dotted lines in Fig. 1. This position is the second stop of the hammer or its farthest point back. The breech-block E carries on each side a lever, M M, pivoted to the block by pins *n n*. The forward points, *m m*, form hooks and project beyond the face of the block E, and when the block E is in its place close behind the cartridge the hooks *m m* hold firmly the shoulder of the cartridge, and springs N N keep the hooks close to the same, so that when the block E is being drawn back by the hammer H, the hooks *m m* pull the shell of the cartridge out at the rear end of the barrel. Suitable recesses are formed in the breech of the barrel to admit those hooks *m m*, and grooves are cut in the side pieces, D D, to admit the levers M M. The grooves in the side pieces, D D, contract or get shallower toward the rear ends, to press the springs N N together as soon as the shell is nearly extracted, so that the hooks *m m* let the shell drop when it is out of the end of the barrel, and the shell falls through the opening V left in the lower side of the stock for that purpose. To prevent the extracted sheel from falling into the lock, the plate W is properly secured in front of the lock. The spring S S gives the power to the hammer, and it is connected to the hammer H by the link L, which link is connected to the hammer by the pin $l'$ and to the spring S by the pin P. The trigger Q is held against the flange K of the hammer H by the spring U pressing on the arm T', the arm T resting in $r^2$ when the hammer is in the second rest, and in $r'$ when in first rest. The face of the hammer forms an obtuse-angled depression, $h^2 h^3$, and the rear end of the breech-block E is of corresponding form, so that the concussion is simultaneous at all points of contact of the hammer and breech-block.

When the cartridge is in its place, if the gun is not to be discharged immediately, the hammer can be placed at first rest. This first rest, $r'$, is so arranged that the hammer H pushes the breech-block E forward to within about an eighth of an inch of the flange of the cartridge C, so that the pin I goes from $G^3$ nearly to the corner $G^2$. In this position the gun is perfectly safe from any premature discharge, and the hooks *m m* do not yet take hold of the cartridge C; but if the gun is to be discharged, pull the hammer H back again to the second rest and pull the trigger Q. The hammer will then, by the power of spring S S, move forward. The pin I will push the breech-block E close to the cartridge C without striking it. When the pin I arrives at the corner $G^2$, the hammer H will finish its way, the pin I following the concentric curve $G^2$ $G'$. The hammer H will fall with its obtuse-angled concave face $h^2$ $h^3$ on the corresponding face of the breech-block E and strike a quick and powerful blow on the center of the cartridge by means of the front face of the breech-block E, where a projecting point, *c*, hits the center of the cartridge and explodes it. The back pressure of the explosion through the breech-block is taken up by the portion $h^2$ of the face of the hammer and carried over to the center-pin *h* of the hammer, which must be strong enough to stand the blow; but the pressure is never strong enough to open the breech, which could here be done only by pushing back the hammer.

The operation of this gun is so simple, only one movement of the hammer being required to open the breech to remove the old shell and to make ready to fire, that an inexperienced person can readily understand the action, while the small number of pieces necessary in its construction render it a very desirable fire-arm.

What I claim as new, and desire to secure by Letters Patent, is—

1. The hammer H and pin I, in combination with the breech-block E and slotted plate F, all as herein shown and described.

2. The slot $G'$ $G^2$ $G^3$ in the projection F, made as shown and described, for the purpose specified.

3. The combination of the hammer H and its pin I with the slotted plate F, when constructed and operating substantially as shown and described.

4. The combination of the pivoted hooked levers M M, springs N N, and grooved side pieces, D D, for extracting the empty shell, when constructed and operating as herein shown and described.

K. V. BARNEKOV.

Witnesses:
EDWARD E. BUNKER,
DAVID VAN DYCK.